United States Patent
Cornelius et al.

[11] Patent Number: 5,108,477
[45] Date of Patent: Apr. 28, 1992

[54] METHOD FOR MAKING A GLASS ARTICLE

[75] Inventors: Lauren K. Cornelius, Painted Post; Linda H. Marks, Elmira, both of N.Y.; Teresa C. Nolet, Danville, Ky.; Paul A. Tick, Corning; Donald M. Trotter, Jr., Newfield, both of N.Y.

[73] Assignee: Corning Incorporated, Corning, N.Y.

[21] Appl. No.: 526,236

[22] Filed: May 21, 1990

[51] Int. Cl.⁵ .......................... C03B 20/00
[52] U.S. Cl. .................. 65/18.1; 65/18.2; 65/18.3; 65/DIG. 15; 65/63; 65/83; 65/84; 501/40; 501/43; 501/45; 501/49
[58] Field of Search ............ 65/17, 18.1, 18.2, 18.3, 65/18.4, 32.1, DIG. 15, 63, 83, 84, 85; 501/40, 43, 44, 45, 49

[56] References Cited

U.S. PATENT DOCUMENTS

| | | | |
|---|---|---|---|
| 4,239,521 | 12/1980 | Beall | 65/33 |
| 4,314,031 | 2/1981 | Sanford et al. | 501/44 |
| 4,323,654 | 4/1982 | Tick et al. | 501/47 |
| 4,362,819 | 12/1982 | Olszewski et al. | 501/44 |
| 4,501,602 | 2/1985 | Miller et al. | 65/18.2 |
| 4,537,864 | 8/1985 | Tick | 501/30 |
| 4,718,929 | 1/1988 | Power et al. | 65/3.12 |
| 4,789,389 | 12/1988 | Schermerhorn et al. | 65/3.12 |
| 4,885,019 | 12/1989 | Hutta | 65/DIG. 15 |

FOREIGN PATENT DOCUMENTS 62-74032 4/1987 Japan.

OTHER PUBLICATIONS

M. M. Broer et al., "Droplet Spraying of Heavy Metal Fluoride Glass for Optical Fiber Fabrication", Appl. Phys. Lett., 55 (25), pp. 2620-2621 (Dec. 18, 1989).

Primary Examiner—Richard V. Fisher
Assistant Examiner—John J. Bruckner
Attorney, Agent, or Firm—Kees van der Sterre

[57] ABSTRACT

A method for foming glass articles of substantial thickness from unstable glass compositions which normally devitrify when formed by conventional casting or molding processes, is disclosed. The method includes the steps of quench-cooling the glass to form a crystal-free glass feedstock material, and then pressure-consolidating the feedstock at a temperature between the transition temperature and the crystallization temperature of the glass.

12 Claims, 2 Drawing Sheets

METHOD FOR MAKING A GLASS ARTICLE

BACKGROUND OF THE INVENTION

The present invention relates to glass manufacture and more particularly to a method for the manufacture of glass articles from glasses which are not stable against crystallization or devitrification when cooled from a melt.

It is well known that glasses vary widely in their tendency to devitrify on cooling from melts and/or on exposure to high temperature. Even for the manufacture of glass products from conventional glasses, which are generally formulated to maximize stability against devitrification, some attention must be given to the design of melting and forming processes to insure that devitrification of the glass during manufacture is avoided.

The process of devitrification is known to occur at a rate which is temperature dependent. Generally, crystals will not form rapidly in conventional glasses at temperatures below the glass transition temperature, nor will they form at all at temperatures above the liquidus temperature. The liquidus temperature is, by definition, the minimum temperature at which a crystal-free glass melt can be maintained indefinitely.

Within the range of temperatures below the liquidus temperature and above the glass transition temperature, the rate of crystallization can vary widely, depending on the temperature of the glass, the chemical composition of the glass, and the presence or absence of crystal nuclei therein. Some glass compositions crystallize extremely slowly, while other compositions crystallize so rapidly that they are difficult to form into crystal-free products.

The temperature regime of rapid crystallization of any glass composition can readily be determined, and glassforming processes adjusted to minimize the dwell time of the glass in that range. Thus, while some time in the crystallization range must always be tolerated, forming can be carried out such that the glass is rather rapidly cooled or quenched through that range and the development of crystals largely or entirely avoided.

Many compositions capable of forming stable glasses are known. The most widely used class of stable glasses comprises the silicate glasses, wherein $SiO_2$ is a major or predominant constituent. However, relatively stable glass formulations have also been developed in systems based on phosphate, borate, and even halide or oxyhalide compositions.

Glasses formulated for high stability in any of these systems can generally be formed by conventional processes into crystal-free products. In most cases, they can also be reheated and worked or reshaped while softened without undergoing devitrification. In the most stable glassforming systems, the glasses can even be provided as powders, and sintered by heating below the liquidus temperatures into unitary glass articles which are completely amorphous, i.e., essentially free of crystalline inclusions or surface devitrification. Fused silica and doped fused silica are examples of glasses which can successfully be processed in this manner.

A very high degree of stability is essential for sintering processes of the latter type because of the high surface area of the starting glass powder. In many glasses the crystallization process is initiated primarily at the surface rather than in the bulk of the material. Thus high surface area appears to promote rapid crystallization in most of the known composition systems.

U.S. Pat. No. 4,501,602 describes a process for making high-silica glasses which includes the steps of forming a powder or soot of doped silica composition and then flame-sintering the soot at high temperatures to form clear or opalized (phase-separated or crystallized) glass. U.S. Pat. No. 4,718,929 describes methods for forming halide glasses based on $BeF_2$ from vapor-deposited powders which likewise can produce either amorphous (non-crystalline) or polycrystalline metal halide products by high temperature sintering.

U.S. Pat. No. 4,537,864 discloses halide glasses in the Cd-Li-Al-Pb fluoride systems which, in the preferred composition regime, are sufficiently stable to be formed by casting to clear, crystal-free products up to about a centimeter in thickness. U.S. Pat. No. 4,323,654 discloses alkali phosphate glasses having sufficient stability to be formed by casting, while U.S. Pat. No. 4,362,819 discloses alkali fluoroaluminophosphate glasses for optical applications which can be cast into preforms and reshaped by molding.

As shown by the above patents, although relatively stable glasses have been developed in a variety of composition systems of marginal glass-forming stability, it will be readily appreciated that the compositional restraints imposed by the requirement for high glass stability limit the range of compositions which can be used. Even within the composition regimes described, compositions of less than optimum stability but exhibiting excellent optical, electrical or other chemical or physical properties have had no practical utility because of the difficulty of forming them into products of centimeter or greater thicknesses while avoiding devitrification. It will therefore be appreciated that many potentially useful borate, phosphate, halide, and even silicate glasses are known which can perhaps be formed by rapid quenching into glass articles of thin cross-section, but which are not available for convenient use in larger forms.

It is a principal object of the present invention to provide a method for making glass articles from unstable glasses which can be used to make products of substantial bulk or thickness notwithstanding the tendency of the glass toward devitrification below the liquidus.

It is a further object of the invention to provide a glass-forming procedure which utilizes reheating of crystal-free glass powders to form crystal-free glass products from glasses of low or marginal stability against devitrification.

Other objects and advantages of the invention will become apparent from the following description thereof.

SUMMARY OF THE INVENTION

The present invention provides a method for forming glass articles from glasses which are highly unstable, yet which provides glass products which are essentially free of crystallization. The method relies on rapid quenching to avoid glass crystallization, yet permits the fabrication of relatively large, transparent glass articles, of centimeter thickness and greater. Depending on glass composition and the level of instability involved, glass quality can exceed that required for many optical applications, or it can offer freedom from devitrification but with moderate levels of light scattering where this property is not critical to the performance of the glass.

Broadly stated, the method of the present invention comprises the initial step of first forming a crystal-free melt of the selected glass. Typically the glass will be a an unstable glass. For purposes of the present description an unstable glass is a glass which, in particulate form (i.e., as 1 mm or smaller particles) will crystallize before it will sinter to a unitary glass material when heated at a temperature below the liquidus at ambient pressure.

The crystal-free glass melt thus provided is next quench-cooled to form a solidified and completely amorphous glass feedstock material. By completely amorphous is meant that the feedstock is substantially free of crystalline inclusions or surface material. In the process of quenchcooling, the melt is typically formed into a feedstock having at least one cross-sectional dimension which is of sub-millimeter size. This can be a quenched glass tape or ribbon or, more preferably a particulate feedstock material typically comprised of a glass soot or, most preferably small glass beads or granules.

The glass feedstock material thus provided is next heated to a consolidation temperature range which is at least equal to the glass transition temperature ($T_g$), but below the peak crystallization temperature ($T_{xtal}$) of the glass. The peak crystallization temperature, determined by differential scanning calorimetry on samples of powdered glass in accordance with well known practice, is manifested as a large exothermic peak associated with rapid crystallization of the glass as it is heated at a controlled rate through the glass transition and softening temperature ranges. Most preferably, the consolidation temperature or temperature range selected at this stage will be as far from the crystallization temperature as practicable, consistent with the requirement to provide a void-free glass product, in order to avoid crystal growth on any crystal nuclei which may have developed during the quenching step.

During at least some consolidation interval while the glass feedstock is maintained within the temperature range for consolidation, a consolidation pressure is applied to the glass. This consolidation pressure must be at least sufficient to consolidate the feedstock into a dense, void-free glass article within a time interval less than sufficient to initiate devitrification or crystallization of the feedstock during the consolidation interval. In general, lower consolidation temperatures, denoting higher glass viscosities, will require higher consolidation pressures and/or longer consolidation times, and vice-versa.

Depending upon the composition of the glass being consolidated, control over the atmosphere surrounding the glass during the consolidation step may be desirable. In some cases inert gases or a vacuum may be useful, while in other cases reactive atmospheres may be preferred to reduce surface crystallization. Control over the consolidation atmosphere can readily be achieved by known methods.

Finally, the consolidated void-free glass article is cooled from the consolidation temperature at a rate sufficient to avoid the initiation of crystallization therein during cooling. As will be recognized, since devitrification is an equilibrium process dependent upon time and temperature, and since devitrification may proceed at an appreciable rate in unstable glasses even at temperatures well below the crystallization temperature, rapid cooling of the consolidated glass at least to the glass annealing temperature can be of considerable value.

The process above described will be found effective to produce glass articles of centimeter or greater cross-sectional dimensions even in glasses exhibiting very low stability, i.e., where the glasses cannot be directly cast into articles of any size without extensive crystallization. Of course, it will be appreciated that this process may also be utilized to form glass articles from glass compositions of somewhat higher stability, having the substantial advantage of increasing the dimensions of glass products which may be produced from such glasses without the development of devitrification or crystalline inclusions therein.

DESCRIPTION OF THE DRAWINGS

The invention may be further understood by reference to the drawings wherein.

DETAILED DESCRIPTION

As previously noted, the present invention offers particular advantages for the forming of glasses which are too unstable to be cast into large pieces without devitrifying, but which possess unique optical or other physical properties. As an example, certain advanced optical applications have been developed which require large infrared-transmitting lens blanks, having cross-sectional dimensions of 2 cm or more and diameters significantly exceeding the cross-sectional thickness. Such lenses have thus far not been manufacturable from unstable glasses.

One family of glasses advantageously processed in accordance with the invention and offering desirable low infrared absorption and good durability is that of the Cd-Al-Pb-F and Cd-Li-Al-Pb-F glasses. These glasses, described in U.S. Pat. No. 4,537,864, exhibit stability superior to a number of other infrared transmitting halide glasses, but still cannot be cast to thicknesses greater than a few millimeters without excessive devitrification.

Other glass compositions which could be usefully processed by the present method include the heavy metal fluoride glasses, alkali phosphate glasses such as the alkali-$Ta_2O_3$-$B_2O_3$-$P_2O_3$ glasses of U.S. Pat. No. 4,323,654, fluoroaluminophosphate glasses such as the $R_2O$-$Al_2O_3$-$P_2O_3$-F glasses (wherein $R_2O$ is an alkali metal oxide) of U.S. Pat. No. 4,362,819, and tin-phosphorous oxyfluoride glasses such as the Sn-P-0-F glasses of U.S. Pat. No. 4,314,031. Of course, still other glasses characterized by low viscosity at the liquidus (most preferably not exceeding about 50 poises) and insufficient stability for conventional casting, molding or sintering processes may also be advantageously processed in accordance with the invention.

In general the batching and melting processes utilized to provide crystal-free melts of the selected glasses to be formed are well known. Melting may be carried out on a batch basis or on a continuous basis, utilizing melting equipment which is sufficiently compatible with the glass to insure homogeneous melting of starting materials. Melting temperatures well above the liquidus of the glass are normally used to insure that the melts are homogeneous and crystal-free.

Once thorough melting is achieved, the glass may be formed by any process providing a glass cooling rate sufficiently rapid to avoid actual or incipient devitrification of the glass. However, while quenching to rolled ribbon or thin sheet may in principal be used, the preferred practice is to form the glass into rapidly quenched small glass particles.

Figure 1:
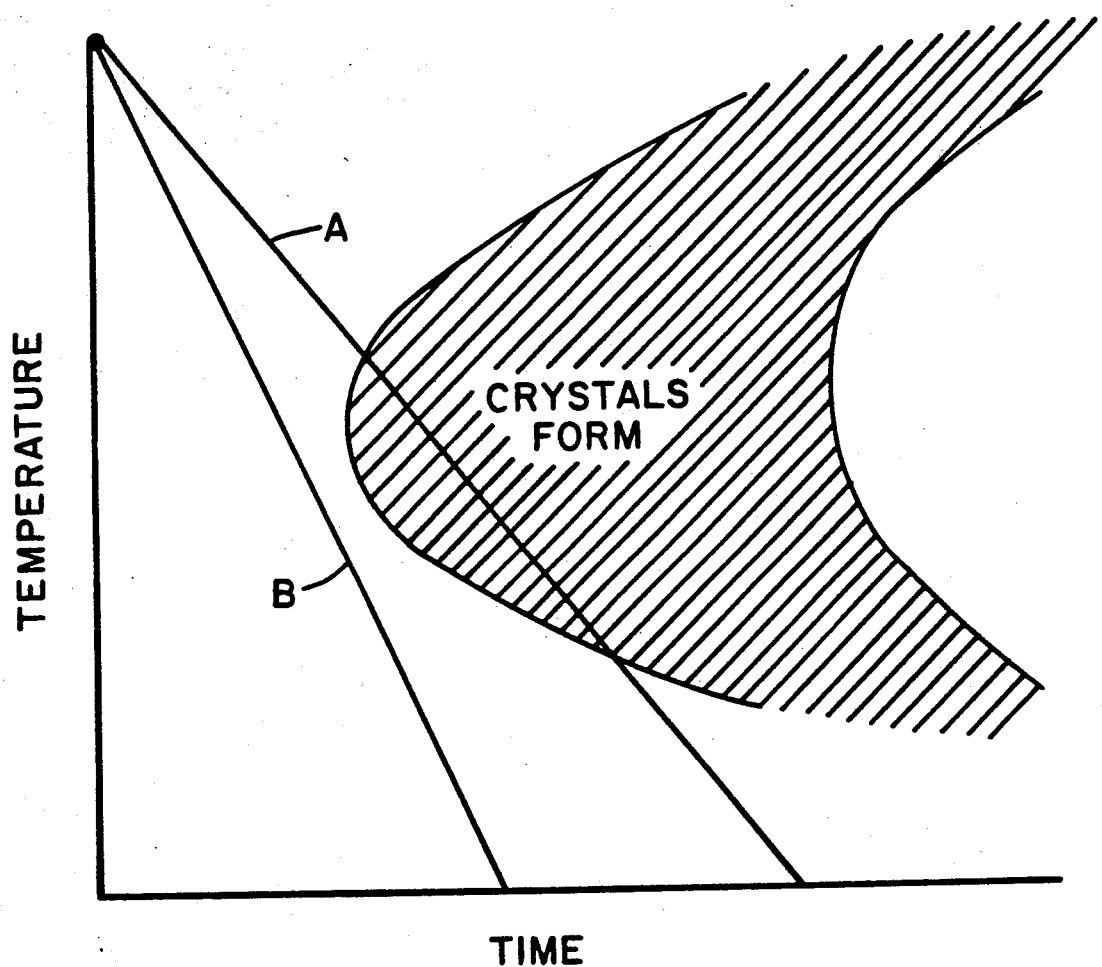
FIG. 1 is a plot illustrating the theoretical timetemperature dependence of the crystallization process in inorganic glasses.

The time and temperature dependence of the process of crystallization in glasses is schematically illustrated in FIG. 1 of the drawing. FIG. 1 is a time-temperature diagram on which the boundary conditions for glass crystallization are shown, together with two representative cooling profiles which might be followed during the manufacture of a typical glass. In cooling plot A, the rate of temperature reduction with time is sufficiently slow that the glass resides for a significant time in the region where crystals may readily form. The product of this cooling process would be expected to exhibit at least some surface or bulk crystallinity.

In cooling plot B, the cooling rate of the glass is sufficiently rapid that minimal time is spent in the region of crystal formation for the glass. Glass material cooled in this fashion would be expected to be substantially free of surface or bulk crystallinity.

As is known, for glasses which can be formed by vapor deposition processes, an amorphous glass feedstock consisting of particulate glass soot of submicron size can be produced directly from the vapor phase. However, for glasses most conveniently made by melting, the preferred method for providing a particulate glass feedstock, which is more generally applicable to unstable glasses of essentially any composition, is that of spherulizing or otherwise pulverizing the glass directly from the melt.

A particularly preferred technique for accomplishing small particle formation with rapid cooling of the melt is to form the melt into a small stream of molten glass, and then to rapidly quench and disperse the molten glass stream with a jet of compressed gas directed at the stream. The gas used will depend on the glass composition employed, and could therefore constitute an oxidizing, reducing, neutral, or even a reactive medium.

The product of this process is typically a solidified glass feedstock made up of generally spherical glass beads, with diameters below one millimeter and most generally falling within the range of about 1–500μm. The solidified glass is normally free from crystalline inclusions and surface devitrification and thus, on a relative scale, is slow to crystallize when reheated above the glass transition temperature of the glass.

Although such feedstock is essentially crystal-free, careful consolidation processing is still required in order to avoid the development of crystalline phases on reheating. The difference between the glass transition temperature $T_g$ and the glass crystallization temperature $T_{xtal}$ in unstable glasses such as described seldom exceeds 120° C. and can be as low as 40° C. Further, as previously noted, crystallization in unstable glasses can be initiated at temperatures well below the crystallization temperature of the glass, where the glass is maintained in a heated condition for any prolonged period of time. Therefore, control over the time and temperature of the consolidation process is critical.

The consolidation process utilized for converting the glass feedstock into a large, void-free, and homogeneous glass pressing requires the application of substantial pressure to the glass. However, the exact means of pressure application is not critical, and the process selected can be a conventional hot pressing process, a hot isostatic pressing (HIP) process, or any other process which facilitates glass flow at the high viscosities necessary for the low temperature processing of these glasses.

As has already been implied, pressureless sintering is not a suitable method for the consolidation of these unstable glasses. By definition, in these glasses, devitrification occurs more rapidly than sintering at subliquidus temperatures effective to cause softening and flow of these glasses. And at consolidation temperatures above the liquidus, sufficiently rapid cooling of massive articles to avoid devitrification cannot be achieved.

Even though pressures attainable by hot pressing or HIP processing can be quite high, insufficient heating of the glass during pressure application can provide a consolidated product wherein substantial glass inhomogeneity is retained. This inhomogeneity probably arises from so-called remnant sutures between the incompletely fused particles of the precursor glass feedstock. Thus the consolidation temperature selected must be low enough to avoid crystallization during reheating and cooling, yet high enough to achieve complete fusion so that the glass is also homogeneous. And, the residence time at the selected consolidation temperature must be no longer than needed to achieve a homogeneous product.

The invention is more fully illustrated by the following detailed examples, which are not intended to be limiting.

EXAMPLE 1

A glass in the Cd-Li-Al-Pb oxyfluoride system is selected for processing. The glass has a composition, in approximate weight percent, of about 17.13% $AlF_3$, 50.04% $PbF_2$, 1.07% LiF, 1.58% KF, 4.08% $YF_2$, 7.89% CdO, 15.50% $CdF_2$, and 2.72% $LaF_2$, and is batched from the fluorides and oxides in these proportions.

The batch thus provided is melted in a platinum crucible contained in a glove box under nitrogen at 1000° C., being maintained at that temperature for 15 minutes, then stirred, and finally poured into a preheated platinum funnel.

The glass in the funnel is maintained at about 1000° C., a temperature well above the glass liquidus of 700° C. While at this temperature, the glass is delivered from the funnel in a thin liquid stream which is intersected below the funnel, and at a right angle to the glass stream, by a jet of helium gas. This helium jet, supplied at a pressure of 15 psig, disperses the molten glass stream to fine droplets which, under the conditions described, are very rapidly quenched to solid glass beads.

Figure 2:
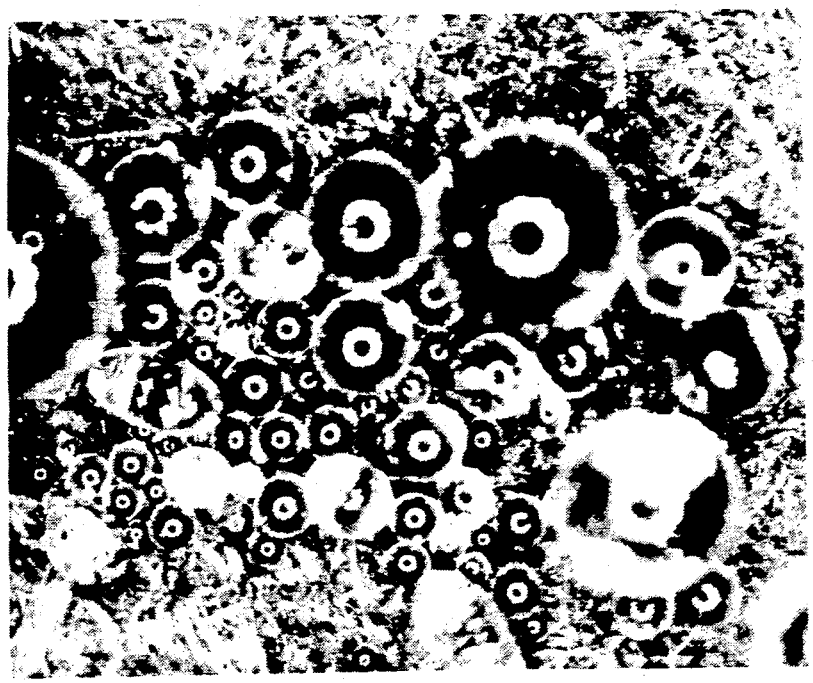
FIG. 2 is an optical photomicrograph of an amorphous glass feedstock material useful in accordance with the invention.

An optical micrograph of glass beads produced by this process, at a magnification of 64x, is shown in FIG. 2 of the drawing. These beads evince no devitrification, although some feedstock contamination from debris present in the glove box is seen. The beads range in diameter from about 35–360 μm, with most being larger than 150 μm.

The glass beads produced as described are transferred to a second glove box for use as a consolidation feedstock in a hot pressing process. Several consolidation runs are carried out, at temperatures generally ranging from the transition temperature ($T_g$) of the glass (about 310° C.) to the crystallization temperature ($T_{xtal}$) of the glass (about 350° C.). The consolidation pressure used is about 70 psi, and the times at peak consolidation temperature range from about 0.5–16 minutes.

The results of several of the consolidation runs on this glass are shown in Table 1 below. Included in the Table for each run are the peak consolidation temperature employed, the residence time of the glass at peak consolidation temperature, and the observed results. Included in the results are an indication of the degree of consolidation achieved, as well as a report of glass devitrification (devit.) observed, if any.

TABLE 1

Consolidation Examples

| | TEMP (°C.) | TIME (min) | Observed Results |
|---|---|---|---|
| 1 | 310° C. | 0.5 | Some deformation of beads |
| 2 | 310° C. | 4.0 | No consolidation |
| 3 | 320° C. | 0.5 | Poorly consolidated |
| 4 | 320° C. | 1.0 | Fair consolidation |
| 5 | 320° C. | 2.0 | Good consolidation |
| 6 | 320° C. | 4.0 | Fully consolidated |
| 7 | 320° C. | 8.0 | Some devit. in center |
| 8 | 320° C. | 16.0 | Severe devit., broken |
| 9 | 330° C. | 0.5 | Not consolidated; some melting |
| 10 | 330° C. | 4.0 | Consolidated; some devit. in center |
| 11 | 340° C. | 4.0 | Consolidated; patches of devit. |
| 12 | 350° C. | 4.0 | Consolidated; severe devit. |

As is evident from an examination of the data presented in Table 1, there is a range of process times and temperatures within which fully consolidated samples free from devitrification can be made. Best consolidation was achieved in runs 5 and 6, at a temperature just 10° C. above the glass transition temperature for the glass, and 30° C. below the crystallization temperature thereof.

Runs carried out at the glass transition temperature did not achieve good consolidation of the glass, the glass exhibiting poor consolidation or significant inhomogeneities due to the initial bead structure of the feedstock material. At the other extreme, runs carried out at temperatures too close to the crystallization temperature, or for excessive times, invariably resulted in devitrified products. It was noted that, as the consolidation temperature used begins to closely approach the crystallization temperature, it is very difficult to achieve consolidation without at the same time causing at least some devitrification of the product.

Figure 3:
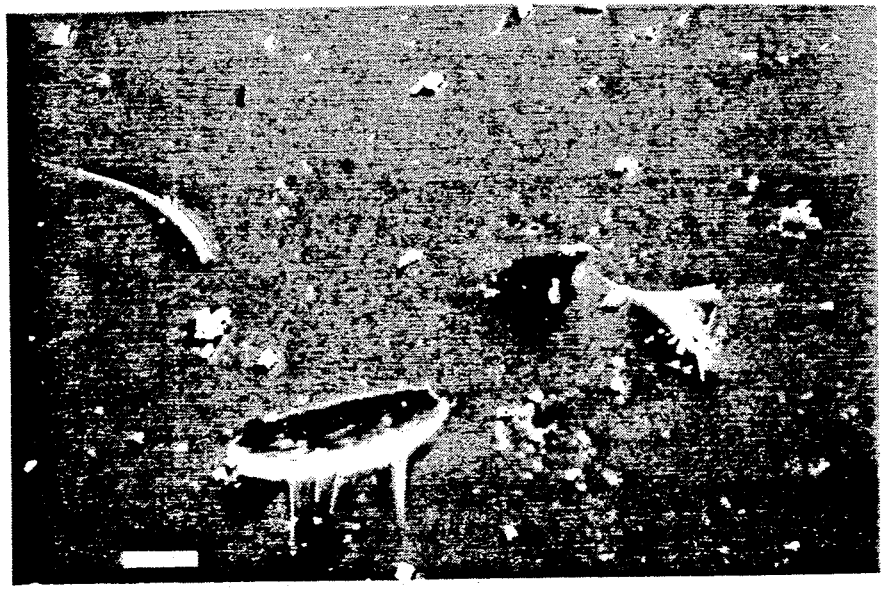
FIG. 3 is an electron photomicrograph of a fracture surface of a glass article formed from an unstable glass in accordance with the invention.

A scanning electron photomicrograph of a fracture surface of a fully consolidated glass article produced in accordance with the above-described procedure is shown in FIG. 3 of the drawing, wherein the white bar indicates a dimension of 10 μm. Although glove box debris is still evident in the consolidated material, the article nevertheless exhibits a smooth or conchoidal fracture surface characteristic of a homogeneous, amorphous glass. No evidence of remnant sutures from the bead feedstock, or devitrification from the consolidation process, is seen.

EXAMPLE 2

A batch is compounded for an alkali fluoroaluminophosphate glass. The batch is compounded of Al(PO$_3$)$_3$, KPF$_6$, LiPF$_6$ and NaPF$_6$ to provide a batch composition of about 30 mole % Al(PO$_3$)$_3$, 23.3 mole % KPF$_6$, 23.3 mole % LiPF$_6$, and 23.3 mole % NaPF$_6$. The batch is tumble mixed and then melted in an uncovered platinum crucible at about 1000° C. for 10 minutes.

The fluid melt thus provided is next poured into a preheated platinum funnel maintained at about 700° C. The output of the funnel is positioned above a compressed helium gas stream wherein the jet of helium has sufficient velocity to disperse the melt issuing from the heated funnel into small glass beads. These beads, which are captured in a stainless steel container, are inspected and found to be completely amorphous and free from surface devitrification. The transition temperature of the glass forming the bead feedstock is about 326° C.

The glass bead feed material thus provided is next consolidated in an induction-heated hot press which is situated in a glove box provided with a nitrogen consolidation atmosphere. Three different consolidation schedules are used, at peak consolidation temperatures of 350° C., 375° C., and 395° C., respectively. The consolidation pressure in each case is 70 psi, applied during a one-minute hold after the peak consolidation temperature is reached.

No consolidation of the beads is achieved at 70 psi pressure at either of the 350° C. or 375° C. consolidation temperatures. However, at the 395° C. peak temperature, full consolidation was achieved. Electron photomicrographs of the consolidated glass show good fusion of the glass bead feedstock, with very few bead boundaries still visible and no evidence of devitrification being seen.

EXAMPLE 3

A batch for a low-melting lead-tin oxyfluoride glass is compounded, the batch having a composition, in mole %, of about 4.0% PbF$_2$, 52% SnF$_2$, and 44.0% PO$_{2.5}$. The batch is thoroughly mixed and then melted in an uncovered vitreous carbon crucible at a temperature of about 440° C. for a melting interval of about 20 minutes.

After melting is completed, the fluid melt is poured through a preheated platinum funnel as in Example 2, except that the funnel preheat temperature is about 400° C. The glass stream from the funnel traverses a compressed nitrogen stream which is of sufficient velocity to disperse the glass stream into small beads of oxyfluoride glass. The transition temperature of the glass forming the beads is about 150° C.

The glass bead feedstock thus provided is next hot pressed in the induction-heated hot press utilized in Example 2. Hot pressing is again carried out under nitrogen and again the peak consolidation pressure used is 70 psi.

Hot pressing of the beads at a peak consolidation temperature of 150° C. for a peak consolidation time of about one minute provides a clear, well consolidated glass body with a few residual bubbles but no evidence of devitrification or residual bead boundaries.

A repeat of the foregoing procedure, utilizing a larger quantity of glass beads and a longer hold of two minutes at the peak consolidation temperature and pressure, produced a pressing of approximately 1 cm thickness which also exhibited substantial freedom from devitrification and remnant bead sutures.

It will of course be appreciated that, while conventional hot pressing as above described represents a simple and convenient method for achieving the level of consolidation pressure desired, processes other than un axial hot pressing can be used to modify the results obtained. For example the glass feedstock may first be consolidated into a largely void-free intermediate material by uniaxial hot pressing, and can then be subjected as necessary to a final HIPing process to remove any residual gas bubbles which may remain. The preferred range of peak consolidation temperature will depend largely on the size of the temperature range between the glass transition and crystallization temperatures, but in general, temperatures in the range of about 10°-100° C. above the glass transition temperature will be preferred.

As will also be readily apparent to those skilled in the art from the foregoing description, the process of the invention is not limited to fluoride, halide or fluorophosphate glasses, but is instead applicable to any of a wide variety of unstable glasses provided they may be formed into fully vitreous glass feedstock by an appropriate quenching process.

The foregoing examples clearly demonstrate that the consolidation of high surface area glass particles, most preferably glass bead feedstock as shown in the examples, can produce homogeneous glass products free of surface or bulk devitrification even in glass systems of very low glass stability. Thus high pressure consolidation at relatively low temperatures and high viscosities, provided a crystal-free glass feedstock can be prepared, can greatly expand the range of glass composition over which high quality glass products can be produced in glass systems of low or marginal stability.

In summary, while the invention has been particularly described above with respect to specific materials and specific procedures, it will be recognized that those materials and procedures are presented for purposes of illustration only and are not intended to be limiting. Thus numerous modifications and variations upon the compositions and processes specifically described herein may be resorted to by those skilled in the art within the scope of the appended claims.

We claim:

1. A method for the manufacture of a devitrification-free glass article from an unstable halide, phosphate, borate or oxyfluoride glass which comprises the steps of:
   (a) forming a crystal-free melt of an unstable halide, phosphate, borate or oxyfluoride glass;
   (b) quench-cooling the melt to form a solidified glass feedstock material which is essentially free of crystals, the feedstock material being of sub-millimeter cross-section in at least one dimension;
   (c) heating the glass feedstock to a consolidation temperature at least equal to the glass transition temperature $T_g$ but below the peak glass crystallization temperature $T_{xtal}$;
   (d) applying consolidation pressure to the glass feedstock at least while at the consolidation temperature, the consolidation pressure being at least sufficient to consolidate the feedstock into a void-free glass article within a time interval less than sufficient to initiate devitrification of the feedstock, and
   (e) cooling the void-free glass article 2. A method in accordance with claim 1 wherein the glass is a halide glass, phosphate glass, borate glass, or oxyfluoride glass having a melt viscosity at the glass liquidus temperature which does not exceed about 50 poises.

3. A method in accordance with claim 1 wherein the solidified glass feedstock material is a particulate glass.

4. A method in accordance with claim 1 wherein quenchcooling of the glass comprises the step of forming the glass melt into a glass stream and dispersing the glass stream with a stream of a gas.

5. A method in accordance with claim 4 wherein the solidified glass feedstock consists essentially of glass beads having diameters below 1 mm.

6. A method in accordance with claim 4 wherein the glass beads have diameters in the range of about 1-500 μm.

7. A method in accordance with claim 6 wherein consolidation is carried out under an inert atmosphere.

8. A method in accordance with claim 6 wherein consolidation is carried out under a reactive atmosphere.

9. A method in accordance with claim 1 wherein the consolidation temperature is in the range of 10°-100° C. above the transition temperature of the glass.

10. A method in accordance with claim 9 wherein consolidation is carried out under nitrogen.

11. A method in accordance with claim 9 wherein consolidation is carried out under a vacuum.

12. A method in accordance with claim 1 wherein the glass has a composition selected from the group consisting of heavy metal fluoride glasses, Cd-Al-Pb-F glasses, Cd-Li-Al-Pb-F glasses, alkali phosphate glasses, and tin phosphorus oxyfluoride glasses.

* * * * *